US010298497B2

(12) United States Patent
Kamel et al.

(10) Patent No.: US 10,298,497 B2
(45) Date of Patent: May 21, 2019

(54) CONTEXT-AWARE CONTENT PUBLICATION AND RESOLUTION

(71) Applicant: Convida Wireless, LLC, Wilmington, DE (US)

(72) Inventors: George Kamel, Hampton (GB); Ning Wang, Woking (GB); Lijun Dong, San Diego, CA (US); Chonggang Wang, Princeton, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 77 days.

(21) Appl. No.: 15/319,023

(22) PCT Filed: Jun. 19, 2015

(86) PCT No.: PCT/US2015/036582
§ 371 (c)(1),
(2) Date: Dec. 15, 2016

(87) PCT Pub. No.: WO2015/196016
PCT Pub. Date: Dec. 23, 2015

(65) Prior Publication Data
US 2017/0118117 A1  Apr. 27, 2017

Related U.S. Application Data

(60) Provisional application No. 62/014,622, filed on Jun. 19, 2014.

(51) Int. Cl.
*H04L 12/743* (2013.01)
*H04L 12/725* (2013.01)
(Continued)

(52) U.S. Cl.
CPC .......... *H04L 45/7457* (2013.01); *H04L 45/02* (2013.01); *H04L 45/123* (2013.01); *H04L 45/306* (2013.01); *H04L 47/125* (2013.01)

(58) Field of Classification Search
CPC ... H04L 45/7457; H04L 45/02; H04L 45/123; H04L 45/306; H04L 47/125
See application file for complete search history.

(56) References Cited

U.S. PATENT DOCUMENTS

| | | | |
|---|---|---|---|
| 2003/0026268 A1* | 2/2003 | Navas | H04L 29/12009 370/400 |
| 2010/0183018 A1* | 7/2010 | Nikander | H04L 45/02 370/401 |

(Continued)

FOREIGN PATENT DOCUMENTS

WO    2003/023607 A1    3/2003

OTHER PUBLICATIONS

Path Diversity Aware Interdomain Routing Feng Wang, Lixin Gao This full text paper was peer reviewed at lhe direction of IEEE Communications Society subject matter experts for publication in the IEEE INFOCOM 2009 proceedings (Year: 2009).*

(Continued)

*Primary Examiner* — Chi H Pham
*Assistant Examiner* — Weibin Huang
(74) *Attorney, Agent, or Firm* — BakerHostetler

(57) ABSTRACT

The present application is directed to a computer-implemented method of updating context information of content in a router. The method includes the step of receiving a pseudo-content publication (PCP) message from a server including updated content and a Bloom filter. The method also includes the step of determining whether the content on the router is a member of the bloom filter. The method also includes the step of revising the context information of the content on the router being a member of the bloom filter with context information of the updated content received in the PCP message. The application is also directed to a computer-implemented method forwarding a content request from a client to a server. Further the present application is directed (Continued)

to a context-aware router including a non-transitory memory and a processor operably configured to the memory configured to execute one or more of the above-mentioned methods.

7 Claims, 18 Drawing Sheets

(51) Int. Cl.
*H04L 12/751* (2013.01)
*H04L 12/721* (2013.01)
*H04L 12/803* (2013.01)

(56) References Cited

U.S. PATENT DOCUMENTS

| | | | | |
|---|---|---|---|---|
| 2012/0084459 | A1* | 4/2012 | Wu | H04L 45/7453 709/238 |
| 2013/0275544 | A1* | 10/2013 | Westphal | H04L 45/02 709/213 |
| 2013/0326156 | A1* | 12/2013 | Cui | H04L 67/2842 711/144 |

OTHER PUBLICATIONS

A Case for Stateful Forwarding Plane Cheng Yi, Alexander Afanasyev, Ilya Moiseenko, Lan Wang, Beichuan Zhang, Lixia Zhang NDN, Technical Report, NDD-0002, 2012. http://named-data.net/techreports.html (Year: 2012).*
Zink et al., "Characteristics of YouTube Network Traffic at a Campus Network—Measurements, Models and Implications", Computer Networks, Mar. 18, 2009, vol. 53, issue 4, pp. 501-514.
Zhang et al., "Named Data Networking (NDN) Project", NDN Technical Report NDN-0001, Oct. 2010, 26 pages.
Yi et al., "A Case for Stateful Forwarding Plane", NDN Technical Report NDN-0002, Jul. 2012, 16 pages.
Wang et al., "Path Diversity Aware Interdomain Routing", Infocom 2009, The 28th Conference on Computer Communications, IEEE, Apr. 19, 2009, pp. 307-315.
Wang et al., "OSPFN: An OSPF Based Routing Protocol for Named Data Networking", NDN Technical Report NDN-0003, Jul. 2012, 15 pages.
Uhlig et al., "Providing Public Intradomain Traffic Matrices to the Research Community", ACM SIGCOMM Computer Communication Review, Jan. 1, 2006, vol. 36, No. 1, pp. 83-86.
Moy, "OSPF Version 2", RFC 2328 (Proposed Standard), Internet Engineering Task Force, (IETF), Apr. 1998, 244 pages.
Koponen et al., "A Data-Oriented (and Beyond) Network Architecture", Proc, ACM SIGCOMM '07, Aug. 2007, pp. 181-192.
Jacobson et al., "Networking Named Content", ACM CoNEXT '09, Dec. 2009, pp. 1-12.
Ghodsi et al., "Naming in Content-Oriented Architectures", ACM SIGCOMM Workshop on Information-Centric Networking (ICN 2011), Aug. 2011, 6 pages.
Cheng et al., "Understanding the Characteristics of Internet Short Video Sharing: A YouTube-based Measurement Study", IEEE Transactions on Multimedia, Aug. 2013, vol. 15, No. 5, pp. 1184-1194.
Chai et al., "Curling: Content-Ubiquitous Resolution and Delivery Infrastructure for Next Generation Services", IEEE Communications, Mar. 2011, pp. 112-120.
Broder et al., "Network Applications of Bloom Filters: A Survey", Internet Mathematics, 2002, vol. 1, No. 4, pp. 485-509.
Brisco_"DNS Support for Load Balancing", The Internet Engineering Task Force (IETF), RFC 1794, Apr. 1995, 7 pages.
Bloom, "Space/Time Trade-Offs in Hash Coding with Allowable Errors", Communications of the ACM, Jul. 1970, vol. 13, No. 7, pp. 422-426.

* cited by examiner

CONTEXT-AWARE CONTENT PUBLICATION AND RESOLUTION

CROSS-REFERENCE TO RELATED APPLICATIONS

This application is a National Stage Application filed under 35 U.S.C. 371 of International Application No. PCT/US2015/036582, filed Jun. 19, 2015, which claims priority to U.S. Provisional Patent Application No. 62/014,622, filed Jun. 19, 2014, the disclosure of which is incorporated herein by reference in its entirety.

BACKGROUND

In existing IP networks, various mechanisms have been deployed over time to ensure a certain degree of load balancing. In particular, round-robin Domain Name Service (DNS) has generally been used to balance the load between servers belonging to the same domain for hosting content. However, this form of load balancing does not always lead to a consistently balanced load across servers. This may be attributed to the lack of consideration regarding the amount of resources required by data sessions as well as their expected duration. Accordingly, a host-based networking model can be inefficient for accessing multimedia data open to large populations of users dispersed throughout the Internet.

Information-oriented networks (IONs) perform fine-grained traffic engineering across network routes. IONs give IP routers an awareness of content in order to enable them to take a more active role in the routing and delivery of content. In turn, flexible traffic engineering policies can account for the requirements of Internet Service Providers (ISPs) and content consumers. However, a number of challenges related to traffic engineering still exist.

One challenge of IONs is their use of content names in lieu of IP addresses. The supporting ION protocols and mechanisms must be designed with scalability in mind. This can be challenging because the number of contents is significantly greater than the number of servers. Routing by content rather than location therefore can lead to unsustainable networks in the absence of proper scalability provisions.

Another challenge of IONs is attributed to its features of decoupling content identifiers from location information, e.g., IP addresses. Generally, consumers directly interact with the network to retrieve content they are interested in without requiring information on the exact location of the server or cache hosting the content. However, content routers are not made aware of the explicit location of content. Instead, they are only made aware of its implicit direction. This can pose challenges when disseminating information about server loads and path congestion within a domain, as this information can no longer be associated with explicit server IP addresses. Decoupling also makes it harder to relay context information related to content. This is due to the lack of semantic value in explicitly relating this context information to server identifiers.

A further challenge of IONs is localizing content dissemination. Content dissemination should generally be localized around the content consumer. However, this reduces the content retrieval latency for the user. This also reduces the amount of inter-domain traffic.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application directed to a process and system for making intelligent routing decisions during publishing updated content on a router and router resolution in view of subsequent client content requests.

One aspect of the application is directed to a computer-implemented method for updating context information of content in a router. The method includes the step of receiving a pseudo-content publication (PCP) message from a server including updated content and a Bloom filter. In one embodiment, the Bloom filter is a summarized representation of all content IDs hosted at the server. The method also includes the step of determining whether the content on the router is a member of the Bloom filter. In addition, the method includes the step of revising the context information of the content on the router being a member of the Bloom filter with context information of the updated content received in the PCP message. In one embodiment, the context information is a function selected from the server state, network state and combinations thereof. In an exemplary embodiment, the function is selected from server resource availability, path bandwidth, path length and combinations thereof.

Another aspect of the application is directed to a computer-implemented method of forwarding a content request from a client. The method includes the step of receiving the content request from the client. The method also includes the step of reviewing a content record table based upon the content request. The method also includes the step of determining a server for receiving the content request. Further, the method includes the step of sending the content request to the server. In one embodiment, the method further includes the step of installing a forwarding state for an interface to send content data based upon the content request from the server to the client.

Another aspect of the application describes a context aware router including a non-transitory memory having instructions stored thereon for processing a request from a server and/or a content request from a client. The router also includes a processor operatively coupled to the memory configured to perform the instruction including one or more steps disclosed in the process of the above-disclosed aspects of the application. In one embodiment, the memory also includes a content forwarding table for storing a content forwarding network interface associated with the content request that ultimately transmits the content request to the client. In another embodiment, the content record table also stores context information for a content id. In a further embodiment, the content record table stores a content resolution interface associated with the content id.

In yet another aspect of the application, a non-transitory recording medium storing instructions according to the above-disclosed methods that is executable by a processor is described.

There has thus been outlined, rather broadly, certain embodiments of the invention in order that the detailed description thereof may be better understood, and in order that the present contribution to the art may be better appreciated.

DETAILED DESCRIPTION OF THE ILLUSTRATIVE EMBODIMENTS

Figure 1A:
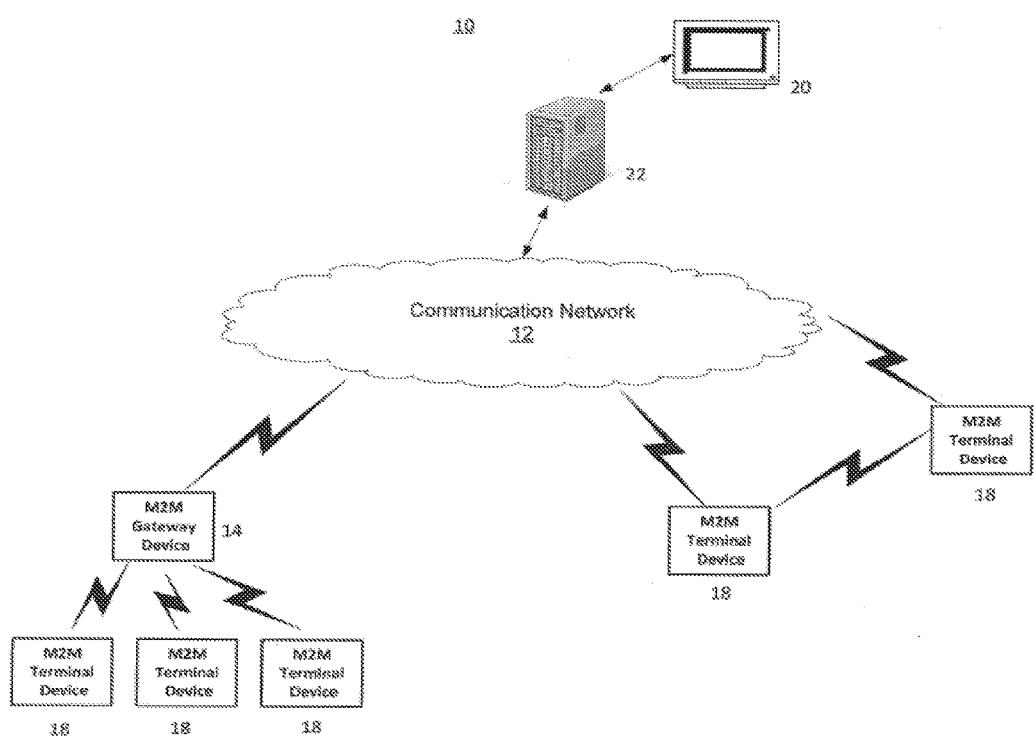
FIG. 1A illustrates a system diagram of an example machine-to-machine (M2M), Internet of Things (IoT), or Web of Things (WoT) communication system in which one or more disclosed embodiments may be implemented according to the present application.

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

The application is generally directed to transmitting context information associated with content in location-independent systems. Moreover, the application addresses overhead based upon signaling sent within a network from the perspective of transmission, router processing and router storage. In particular, a new framework called a "Context-Aware Information-oriented Network Ecosystem" (CAINE) enables advanced content-awareness-based operations to be intrinsically supported by the underlying information-oriented networking functions.

In the CAINE framework, a Bloom-filter-based Context-aware Content Publication and Resolution (CCPR) mechanism may be employed. The Bloom-filter-based CCPR adopts a pre-computation design philosophy whereby the best routes toward different contents are determined during the content publication phase. Namely, the CCPR ensures that requests are routed to the most optimal, e.g., least loaded, source, and along the most optimal, e.g., least congested, path. This is achieved by periodically exchanging among content routers context information relating to individual contents that have been published in the network. Moreover, the content routers add and update Content Routing Tables (CRTs) stored in their architecture whereby best next-hop routing decisions are made. The result of such resolution decisions can lead to better load-balancing within the network, and hence higher network utilization and user quality-of-service. It also aims to ensure that content traffic is obtained from the source most local to the content consumer, so as to minimize the overall length of the content delivery path. CCPR, in similar fashion with IONs, hides the network locations of source nodes from content routers. By so doing, time and network resources for the content resolution phase are reduced such that content requests are routed towards the most optimal (least loaded) source, and along the most optimal (least congested) path.

Moreover, all content routers within a domain are empowered with knowledge to help them make accurate decisions during content resolution. These protocols follow a gossip-style approach to content publication and resolution, in which the physical signaling routes of content resolution and corresponding content delivery paths are coupled. This helps reduce and/or eliminate the need for two round-trip requests as required in today's Internet, and in turn, reduces the overall content retrieval time.

The following acronyms will be commonly used in the instant application and are therefore provided below in Table 1 for reference:

TABLE 1

| ACRONYM | DESCRIPTION |
|---|---|
| AE | Application Entity |
| ADN | Application Dedicated Node |

TABLE 1-continued

| ACRONYM | DESCRIPTION |
|---|---|
| ASN | Application Service Node |
| CAINE | Context-Aware Information-oriented Network Ecosystem |
| CCPR | Context-aware Content Publication and Resolution |
| CDT | Content Data Table |
| CFE | Content Forwarding Engine |
| CFT | Content Forwarding Table |
| CR | Content Request |
| CRME | Content Resolution and Mediation Entity |
| CRT | Content Routing Table |
| CSE | Common Service Entity |
| CURLING | Content-Ubiquitous Resolution and Delivery Infrastructure for Next Generation Services |
| DNS | Domain Name System |
| DONA | Data-Oriented Network Architecture |
| ECD | Existing-Content De-publication |
| FIB | Forwarding Information Base |
| ICMP | Internet Control Message Protocol |
| ION | Information-Oriented Network |
| IM | Information Management |
| IN | Infrastructure Node |
| IoT | Internet of Things |
| IP | Internet Protocol |
| ISP | Internet Service Provider |
| M2M | Machine-to-Machine |
| MN | Middle Node |
| NDN | Named-Data Networking |
| NSE | Network Service Entity |
| OCP | Original-Content Publication |
| OSPF | Open Shortest Path First |
| OSPFN Networking | Open Shortest Path First for Named Data |
| PCP | Pseudo-Content Publication |
| PIT | Pending Interest Table |
| QoE | Quality of Experience |
| QoS | Quality of Service |
| RH | Resolution Handler |
| TE | Traffic Engineering |

This application is intended to cover platform functionality and support for both application enablement platforms (AEPs) and connected device platforms (CDPs). AEPs include an application enablement layer and a service layer including the World Wide Web and Internet. The application enablement layer includes but is not limited to the following: (i) servicing APIs, rules/scripting engine; (ii) SDK programming interface; and (iii) enterprise systems integration. The application enablement layer may also include value-added services including but not limited to discovery, analytics, context and events. The service layer including the world wide web and Internet may comprise, for example, analytics, billing, raw APIs, web service interfaces, semantic data models, device/service discovery, device management, security, data collection, data adaptation, aggregation, event management, context management, optimized connectivity and transport, M2M gateway, and addressing and identification. The CDPs may include connectivity analysis, usage analysis/reporting/alerts, policy control, automated provisioning, SIM activation/deactivation, and subscription Activation/Deactivation.

General Architecture

FIG. 1A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc.

As shown in FIG. 1A, the M2M/IoT/WoT communication system 10 includes a communication network 12. The communication network 12 may be a fixed network, e.g., Ethernet, Fiber, ISDN, PLC, or the like or a wireless network, e.g., WLAN, cellular, or the like, or a network of heterogeneous networks. The network may include the above-noted CAINE network. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 1A, the M2M/IoT/WoT communication system 10 may include the Infrastructure Domain and the Field Domain. The Infrastructure Domain refers to the network side of the end-to-end M2M deployment, and the Field Domain refers to the area networks, usually behind a M2M gateway. The Field Domain includes M2M gateways 14, such as Content Routers (CRs), and terminal devices 18, such Content clients. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices, e.g., cellular and non-cellular as well as fixed network M2M devices, e.g., PLC, to communicate either through operator networks, such as the communication network 12 or direct radio link. For example, the M2M devices 18 may collect data and send the data, via the communication network 12 or direct radio link, to a M2M application 20 or M2M devices 18. The M2M devices 18 may also receive data from the M2M application 20 or a M2M device 18. Further, data and signals may be sent to and received from the M2M application 20 via an M2M service layer 22, as described below. M2M devices 18 and gateways 14 may communicate via various networks including, cellular, WLAN, WPAN, e.g., Zigbee, 6LoWPAN, Bluetooth, direct radio link, and wireline for example.

Figure 1B:
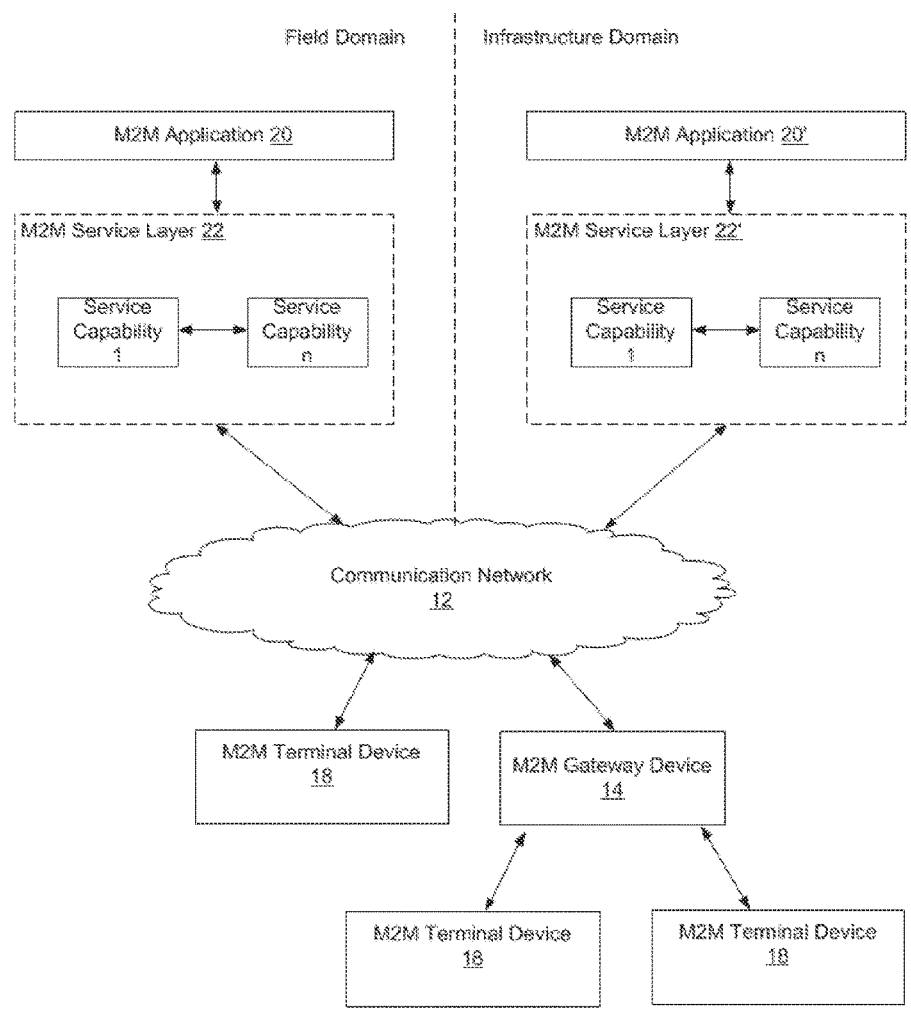
FIG. 1B illustrates a system diagram of an example architecture that may be used within the M2M/IoT/WoT communications system illustrated in FIG. 1A according to the present application.

Referring to FIG. 1B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18 and communication networks 12 as desired. The M2M service layer 22 may be implemented by one or more servers such as the one or more Content servers in this application, computers, or the like. The M2M service layer 22 provides service capabilities that apply to M2M terminal devices 18, M2M gateway devices 14 and M2M applications 20. These may include routers. The functions of the M2M service layer 22 may be implemented in a variety of ways. For example, the M2M service layer 22 could be implemented in a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers such as a content server, computers, virtual machines, e.g., cloud/compute/storage farms, etc., or the like.

Referring also to FIG. 1B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'. Moreover, the M2M service layer may also be configured to interface with other devices such as Content servers, Content routers and Content clients as discussed in this application and illustrated in the figures.

The method of updating context information related to published content on a Content router as well as determining the best next-hop router for resolving a content request as discussed in the present application may be implemented as part of a service layer. The service layer is a software middleware layer that supports value-added service capabilities through a set of Application Programming Interfaces (APIs) and underlying networking interfaces. Both ETSI M2M and oneM2M use a service layer that may contain this method of reserving a Track. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs), e.g., service capabilities. An instantiation of a set of one or more particular types of CSFs is referred to as a Common Services Entity (CSE) which can be hosted on different types of network nodes, e.g., infrastructure node, middle node, application-specific node. Further, the method of reserving a Track as described in the present application can be implemented as part of an M2M network that uses a Service Oriented Architecture (SOA) and/or a resource-oriented architecture (ROA) to access services such as the reserving a track according to the present application.

Figure 1C:
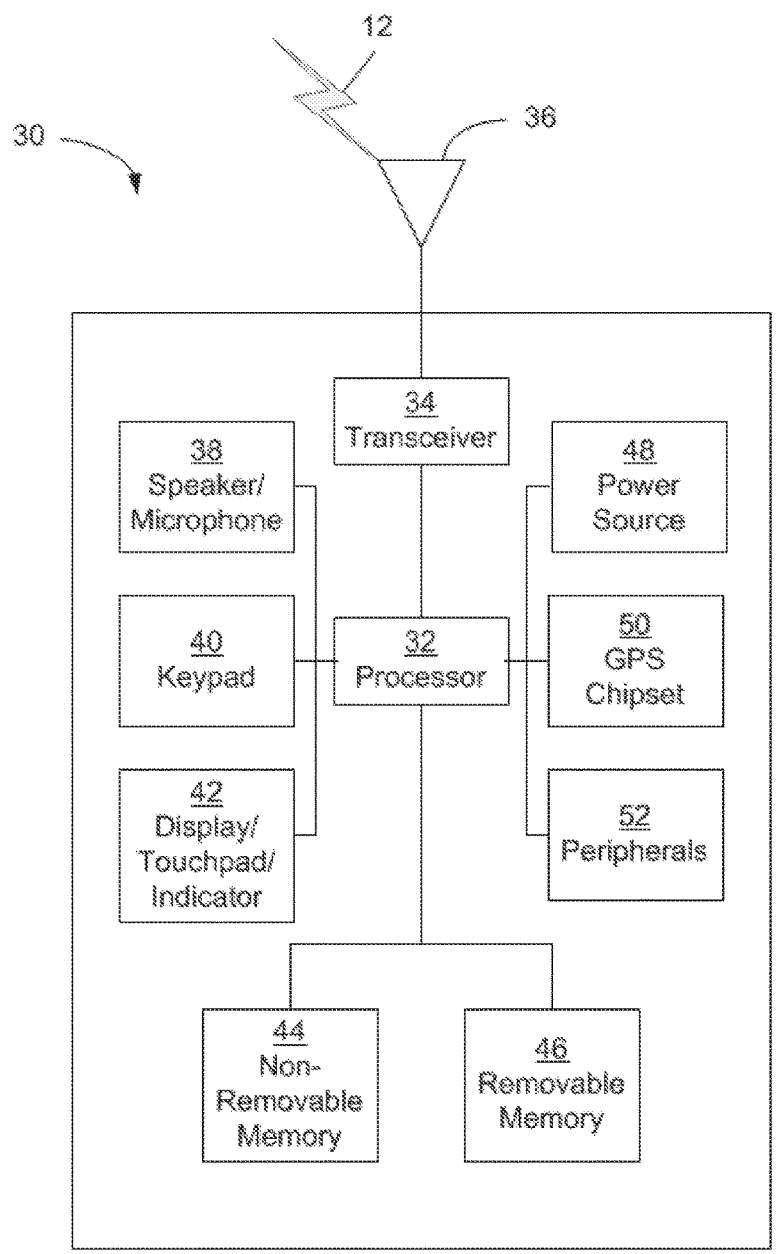
FIG. 1C illustrates a system diagram of an example M2M/IoT/WoT terminal or gateway device that may be used within the communications system illustrated in FIG. 1A according to the present application.

FIG. 1C is a system diagram of an example M2M device 30, such as an M2M terminal device 18 or an M2M gateway device 14 for example. As shown in FIG. 1C, the M2M device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. For example, the processor for a content router may include a Content Publication Manager (CPM), Bloom filter processor, and/or a Content Resolution Manager (CRM) as will be discussed in more detail below and illustrated in the accompanying drawings. The M2M terminal device 18 may be a Content client and the M2M gateway device 14 may be a Content router or Content server according to the description of the application. It will be appreciated that the M2M device 40 may include any sub-combination of the foregoing elements while remaining consistent with an embodiment. This device may be a device that uses the disclosed systems and methods for embedded semantics naming of sensory data. The M2M device 30 may also be employed with other devices as described in this application and as illustrated in the figures.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 1C depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 1C as a single element, the M2M device 30 may include any number of transmit/receive elements 36. More specifically, the M2M device 30 may employ MIMO technology. Thus, in an embodiment, the M2M device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable non-transitory memory, such as the non-removable memory 44 and/or the removable memory 46. The non-removable memory 44 may include random-access memory (RAM), read-only memory (ROM), a hard disk, or any other type of memory storage device. According to this application, the memory may include a Content Record Table (CRT) and/or a Content Forwarding Table (CFT) as will be discussed in more detail below and illustrated in the accompanying drawings. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1D:
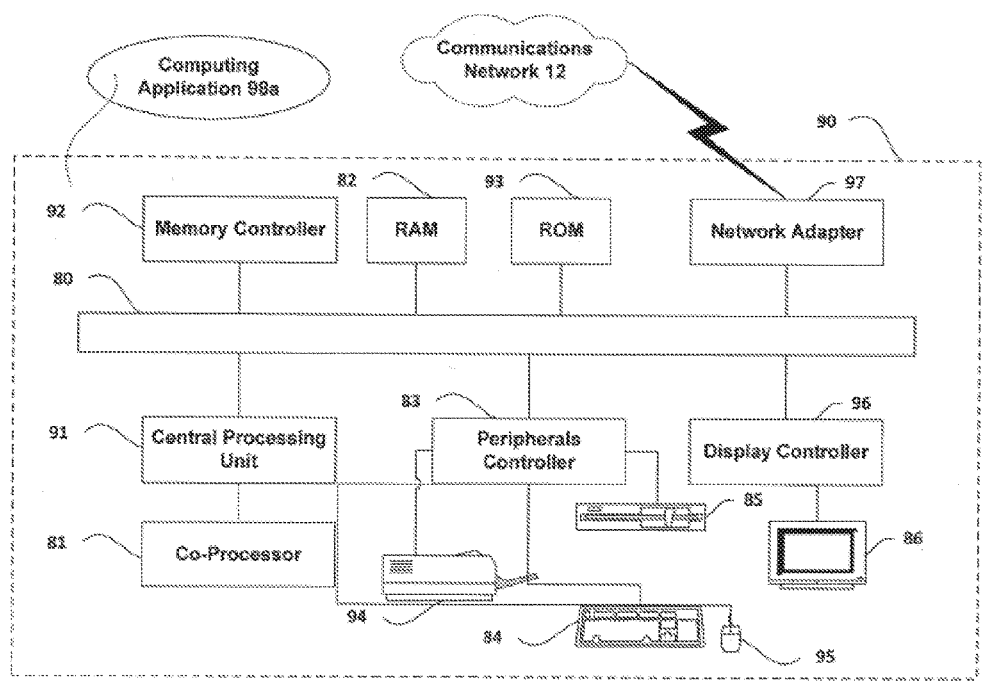
FIG. 1D is a block diagram of an example computing system in which aspects of the communication system of FIG. 1A and the context-aware content publication and resolution concepts described herein may be embodied according to the present application.

FIG. 1D is a block diagram of an exemplary computing system 90 on which, for example, the M2M service platform 22 of FIG. 1A and FIG. 1B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for embedded semantic naming, such as queries for sensory data with embedded semantic names.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, may display sensory data in files or folders using embedded semantics names. Further, computing system 90 may contain network adaptor 97 that may be used to connect computing system 90 to an external communications network, such as network 12 of FIG. 1A and FIG. 1B.

OneM2M Architecture

Figure 2A:
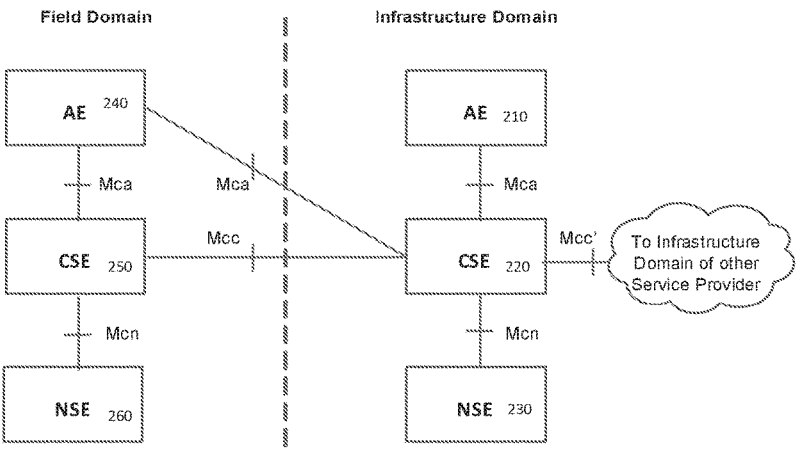
FIG. 2A illustrates an embodiment of a oneM2M architecture according to the present application.

The oneM2M architecture may also include a Service Layer is shown in FIG. 2A. The goal of the Service Layer is to provide "horizontal" services that can be utilized by different 'vertical' M2M silo systems and applications, e.g., e-Health, fleet management, and smart homes. In particular, the Service Layer includes a Common Service Entity (CSE) 220 in a Field Domain and Infrastructure Domain as illustrated in FIG. 2A. A CSE contains multiple logical functions called "Common Service Functions (CSFs)", such as "Discovery", "Data Management & Repository." The CSE supports four reference points. The Mca reference point interfaces with the Application Entity (AE) 210. The Mcc reference point interfaces with another CSE 250 within the same service provider domain and the Mcc' reference point interfaces with another CSE in an Infrastructure Domain of another Service Provider. The Mcn reference point interfaces with the underlying network service entity (NSE) 230/260. A NSE 230/260 provides underlying network services to the CSEs 220/250, such as device management, location services and device triggering.

Figure 2B:
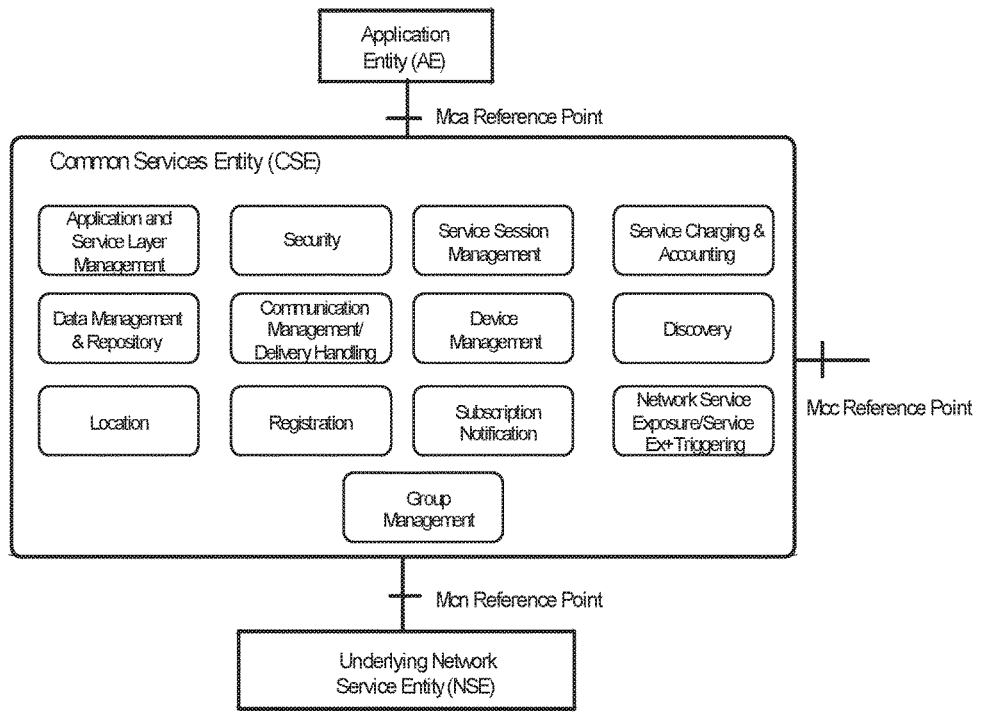
FIG. 2B illustrates an embodiment of oneM2M common service architecture according to the present application.

According to an embodiment, the proposed CCPR may be implemented as a new CCPR CSF in oneM2M. As illustrated in FIG. 2B, the CCPR CSF may include one or more functionalities. In particular, the CCPR CSF may reside in different Common Service Entities (CSE) such as M2M servers, M2M gateways, and M2M devices.

The CCPR CSF has context-aware content publication and resolution functions. Moreover, the Content server connects to CCPR CSF in the CSE over an oneM2M Mca interface. OCP and PCP messages received from a Content server can be transmitted over the Mca interface to the CCPR CSF and also transmitted therefrom to the Content client. Content resolution or discovery message as well as content may also be transmitted over Mca interface from the Content client to the CCPR CSF as well as from the CCPR CSF to the Content server over Mca interface.

Two CCPR CSFs (A and B) connect with each other over oneM2M Mcc interface. CCPR CSF A may transmit the proposed OCP and PCP messages to CCPR CSF B over Mcc interface. CCPR CSF B may transmit content resolution and delivery messages to CCPR CSF A. CCPR CSF A may transmit content to CCPR CSF B over Mcc interface. CCPR CSF may receive the proposed OCP and PCP messages from Content server over Mca interface or from another CCPR CSF over Mcc interface. CCPR CSF has the proposed Bloom-filter-based functions to process received PCP messages. CCPR CSF has the function to generate and store the proposed CRT and CFT tables. For example, each content could be modeled as an oneM2M <container> resource. Accordingly, CRT and CFT table can be added as attributes for each individual <container>. In another example, multiple content could be modeled as sub-resource of oneM2M <container>, e.g., <container>/<sub-container>. Then CRT and CFT tables can be added as attributes of <container> resources and may also be added for each individual content (e.g., <sub-container> resource. CCPR CSF may receive content resolution messages from Content Client over Mca interface or from another CCPR CSF over Mcc interface. CCPR CSF has the proposed content resolution functions to choose the appropriate Content server based on context information associated with each content. CCPR CSF has its own data and may play the role of Content Server. Alternatively, the proposed CCPR idea can be implemented to improve existing resource announcement functions in oneM2M. When a resource as a type of content is announced from CSE A to another CSE B, the proposed context information can be contained in the announcement request message from CSE A to CSE B.

Figure 3:
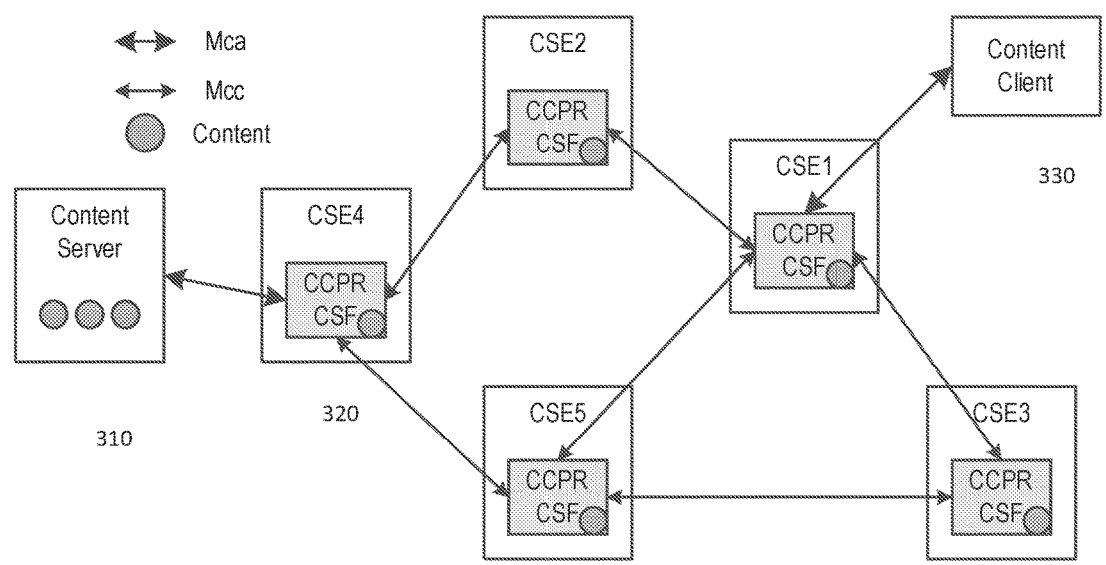
FIG. 3 illustrates an embodiment of a new Common Service Function in a router according to the present application.

In another embodiment, FIG. 3 illustrates a system 300 with CCPR CSFs in CSEs at oneM2M. Each of the CCPR CSFs is shown as having content indicated by the circle. The Mca interfaces between the Content Server 310 and the first-hop CSE on a CR 320, e.g., CSE4, as well as between the Content client 330 and its first-hop CSE, e.g., CSE1. The Mcc interfaces between CSEs. Moreover, oneM2M architecture enables the following types of Nodes:

Application Service Node (ASN): An ASN is a Node that contains one CSE and contains at least one AE. Example of physical mapping: an ASN could reside in an M2M Device.

Application Dedicated Node (ADN): An ADN is a Node that contains at least one AE and does not contain a CSE. Example of physical mapping: an ADN could reside in a constrained M2M Device.

Middle Node (MN): A MN is a Node that contains one CSE and contains zero or more AEs. Example of physical mapping: an MN could reside in an M2M Gateway.

Infrastructure Node (IN): An IN is a Node that contains one CSE and contains zero or more AEs. Example of physical mapping: an IN could reside in an M2M Service Infrastructure.

CAINE Framework

Figure 4:
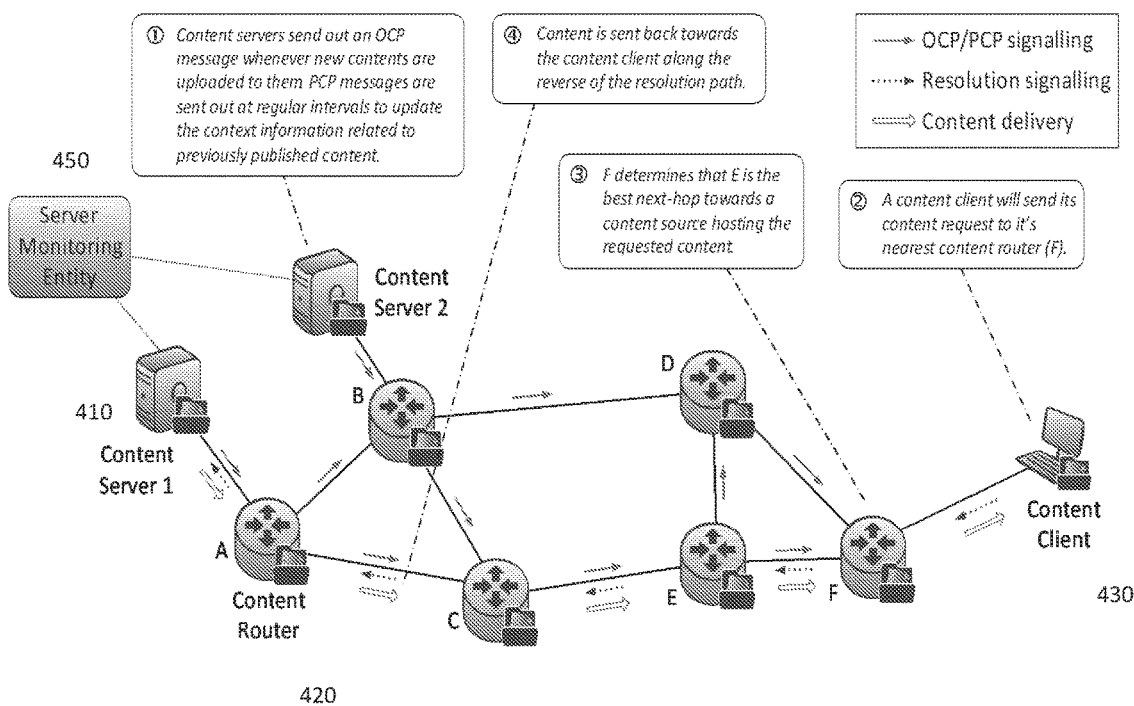
FIG. 4 illustrates an embodiment of a new Context-Aware Information-oriented Ecosystem according to the present application.

According to an aspect of the application, architecture for enhancing content awareness functionality among network routers is disclosed. In one embodiment, as illustrated in FIG. 4, the CAINE 400 includes one or more Content servers 410, one or more content routers 420 and one or more content clients 430. Namely, the Content routers are able to perform one or more of the following actions including, for example, process content-plane messages such as publication and resolution messages, manage content record entries and forwarding states, and correctly handle the transmission of content data itself towards the clients. In a further embodiment, a server monitoring entity 450 may also be includes in communication with one or more content servers 410.

Figure 5:
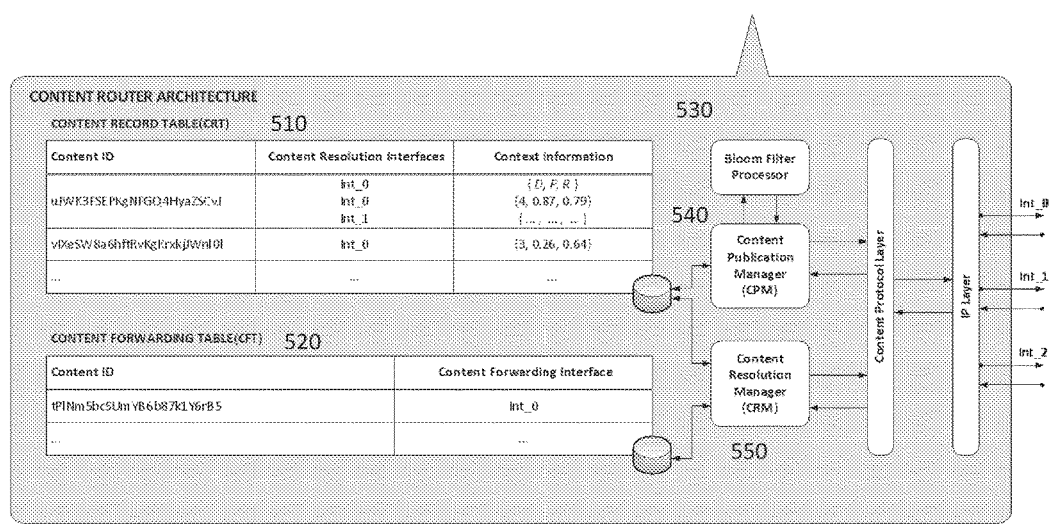
FIG. 5 illustrates an embodiment of a new router architecture according to the present application.

In an embodiment, each CR 410 includes one more tables as shown in FIG. 5. The tables located in the memory of the CR include a CRT 510 and a CFT 520. As shown, the CRT 510 contains information associating content IDs with one or more network interfaces through which content requests can be routed towards a content node holding the requested content. In addition, each content ID item may have network information, e.g., content resolution interfaces, as well as server context information indicating some Quality of Service (QoS) metrics related to reaching the given content from the node at which the CRT resides. For example, the first row, first column of CRT 510, describes certain context information $\{D, P, R\}$ related to the network interface, $Int_0$, for the specific Content ID 'uJWK3FSEPKgNFQ4HyaZSCvj'. Specifically, 'D' stands for the distance (number of hops) from the CR to the content source. 'P' stands for the bandwidth available on the path between the CR and the content source. 'R' stands for the resources available at the content server. These resources may include, for example, the number of additional connections it may support.

A Content Publication Manager (CPM) 540 interfaces with the CRT 510 to add or modify content records in response to different types of publication messages it receives from other content-aware nodes. The CPM 540 communicates with a Bloom Filter Processor 530 to perform operations on pseudo-content publication (PCP) messages to determine the content IDs to which the received messages pertain. In addition, a Content Resolution Manager (CRM) 550 also interfaces with the CRT 510 to perform look-ups on the next-hop interface to forward content requests.

Moreover, the CFT 520 contains forwarding states related to ongoing sessions. It maintains associations between content IDs and outgoing next-hop interfaces. The CFT 520 forwards the associated content it receives towards the Content client requesting the content. In addition, the CRT 510 interface with the CFT 520 via the CRM 550 to install forwarding states in response to content requests it receives. This will be discussed in more detail below regarding content resolution.

In another embodiment, the functionality associated with the CAINE network discussed above is described below. These functionalities include content publication (box 1), content resolution (boxes 2 and 3), and content delivery (box 4).

Content Publication

In another embodiment, one or more Content servers 410 send out messages to CRs 420 located in the system 400. In FIG. 4, the messages are sent out to CR, e.g., CRs A-F, as shown by the single direction arrow. Content publication is performed in two main stages. Original-Content Publication (OCP) is performed once for new content when it appears at a new source. Pseudo-Content Publication (PCP) is periodically performed to propagate context information including non-user data such as for example, congestion, load and path distance, that is ultimately related to content information, e.g., user data, previously published by a server. A PCP is sent out synchronously by all servers whenever the server monitoring entity located within the network detects that the conditions at any of the servers has changed significantly. In both types of content publication, the identity of the content source is hidden from the CR, maintaining the key ION principle of location-independence.

Figure 6:
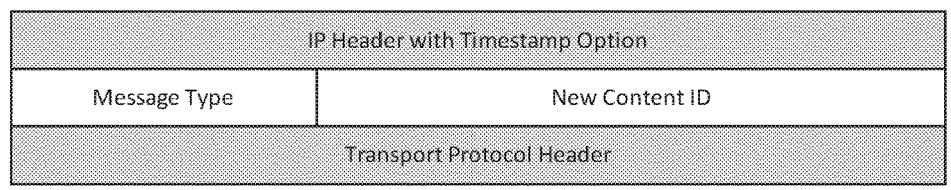
FIG. 6 illustrates an embodiment of an Original-Content Publication Message Format according to the present application.

An OCP message is sent by a server whenever new content is uploaded or created. The focus of the OCP is to make CRs in the same domain aware of the presence of new content, as well as its direction. FIG. 6 shows the proposed format of the OCP message 600, which can be implemented as a new type of ICMP message as an example. The OCP message is encapsulated within an IP packet, and contains two fields: 'Message Type', and 'New Content ID'. The 'Message Type' field simply specifies that this message is an 'OCP' message, whereas the 'New Content ID' field contains the ID of the new content being published. A server identifier is not sent in the OCP, thus completely decoupling content identifiers from server identities.

When a CR receives an OCP message, it will create a new content record in the CRT, including the content ID and the content resolution interface; the context information is not filled until the next PCP message is sent by the server, since the aim of an OCP is to make CRs aware merely of the presence of the content in the network (and the direction towards it). To ensure that all CRs are made aware of the presence of the new content, a simple dissemination mechanism is employed, in which each CR forwards the OCP messages it receives across all of its interfaces, except the one on which the message originally arrived. This will allow the CRs to forward requests for content along the correct interface leading to the content source. In the case where multiple sources along multiple network interfaces exist for a particular requested content, the CR must make a decision on the interface to use, e.g., the direction in which to perform content resolution for the incoming request. To facilitate this decision, it is proposed to use of a special pseudo-content publication, detailed in the following section.

Figure 7:
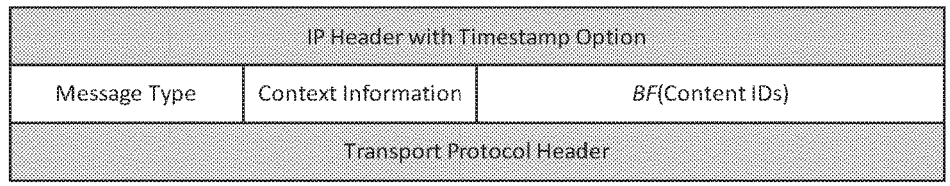
FIG. 7 illustrates an embodiment of a Pseudo-Content Publication Message Format according to the present application.

PCP messages are sent periodically to update CRs with the latest context information (server and network state) related to the contents being hosted at a server. PCP messages disseminate knowledge about the current network conditions to the CRs, without revealing explicit information about the server's identity. This information will empower the CRs to make decisions about routing content requests to the best available content source. FIG. 7 shows the proposed format of the PCP message 700, which can be implemented as a new type of Internet Control Message Protocol (ICMP) as an example.

The PCP message is also contained within an IP packet. The PCP contains three fields: 'Message Type,' Context Information,' and 'Bloom Filter.' The 'Message Type' simply indicates that the message is a 'PCP.' The 'Context Information' field contains network and server context associated with the content hosted at that server. Specifically, this context information relates to the server resource availability, path bandwidth, and the distance in router-hops to the specified content IDs.

The last field in the PCP Bloom filter, is a summarized representation of all of the content IDs hosted at the server that initially generated the PCP. This summarization of content IDs is achieved by the use of Bloom filters, which offer a space- and computation-efficient single-bit-string representation of a set of elements at the cost of a small, yet controllable error probability when performing set membership queries on the string. Information about the content IDs contained within the Bloom filter is deduced by PCPs using prior knowledge of the content IDs gained through OCP dissemination. Therefore, with both the OCP and PCP messages, the CRs can build up next-hop routing knowledge for each content ID, together with their associated context, without ever having exposed to the CRs any form of server identifier.

Bloom Filter Construction

In order to construct the Bloom filter message, each element, $e_{i,1} \leq i \leq n$, in the set, S, is hashed k times using k independent hash functions. The resulting Bloom filter bit array representing S is formed of m bits, which is given by the formula:

$$m \geq (n \log_2(1/p_f))/\ln(2) \qquad (1)$$

where $p_f$ is the false-positive probability, e.g., the probability that a test for element membership is positive when it should be negative.

Figure 8:
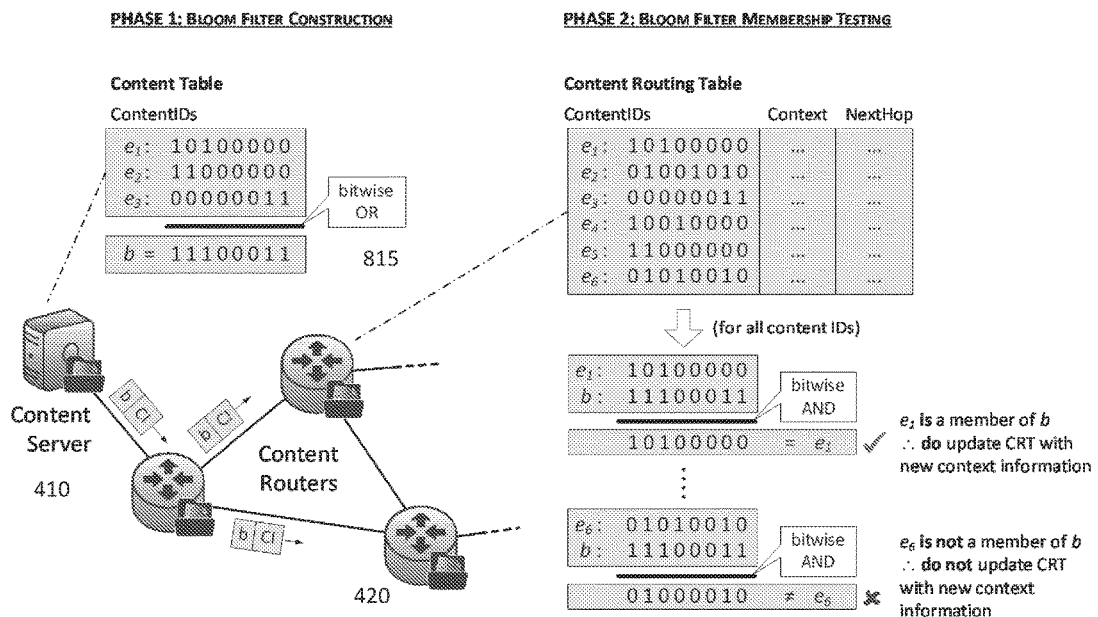
FIG. 8 illustrates an embodiment of a Bloom-filter construction and testing according to the present application.

According to another embodiment, an example of the construction of a Bloom filter by a content server (Phase 1) is shown in FIG. 8. Here, the Bloom filter 815, 'b' is constructed by performing the bitwise OR operation on three elements, $e_1$, $e_2$, and $e_3$. The content server 410 then places the resulting Bloom filter 815 in a PCP packet together with the related Context Information.

Dissemination Strategy for a Message

Once a PCP message has been constructed by a content server, it needs to be disseminated to other CRs within the network. Since the PCP message is building up a distance-vector-type view of network context such as path bandwidth availability and path length, each CR is required to forward the PCP message across all of its interfaces, as in the case of the dissemination of OCP messages. In the process of dissemination, context information on the network side will be added and updated within the PCP at each CR hop.

Frequency with which PCP messages are disseminated is an important consideration. Namely, stale or old context information may reduce the accuracy of content resolution decisions. Since PCP messages relate not only server resources but also network path bandwidth, the frequency with which servers send out PCP messages also needs to take into account the dynamics of link bandwidth availabilities. However, from experiments carried out based on real network traffic traces as well as real traces of user requests to YouTube servers, it is found there is a strong correlation between the available server resources and the link conditions of the network. Therefore, such strong correlation between the two metrics validates a mechanism to determine the most suitable update frequency based purely on the server resource availability.

In another embodiment, the aim is not necessarily to achieve perfectly load-balanced servers (but rather to avoid servers from becoming overloaded), a PCP dissemination frequency based on a non-linear set of triggers is proposed. With such triggers, PCP messages would be sent more often when the server resources are low, and less often when they're not. At times when the server load fluctuates little, hence not crossing any triggers, a PCP message may still be disseminated after a given time has elapsed as to when the last one was sent. The purpose of these time-driven PCPs is to ensure that new contents recently published by a server using an OCP have some context attached to them.

Processing Strategy

According to Phase 2 as shown in FIG. 8, each CR 420 receiving the PCP through its CPM 540 checks each content ID within its CRT 510 for membership in the Bloom filter 818 received from the content server 410. The Bloom filter processor 530 then performs a bitwise AND operation with the Bloom filter. In the example, the result of the bitwise AND operation of $e_1$ and b yields $e_1$, indicating that $e_1$ is a member element of the Bloom filter 815. As a result, the context information in the CRT 510 related to $e_1$ is updated by the CPM 540 with the context information contained in the PCP.

In another embodiment, as illustrated in FIG. 8, the CR tests the membership of another element, $e_6$, present in the CRT 510. The Bloom filter processor 530 present in each CR tests for membership. Here, the result of this test is negative, since the bitwise AND operation does not yield $e_6$. Therefore, the context information in the CRT is not updated.

The optimal number of hash functions, k, is given by:

$$k = \log_2(1/p_f) \qquad (2)$$

whereby optimal implies that m is minimized subject to meeting the target false-positive probability, $p_f$. Thus, taking the optimal case in equation (1) when both sides are equal, m in equation (2) can be substituted and obtain the following expression for the optimal number of hash functions:

$$k = (m \ln(2))/n \qquad (3)$$

From equations (1) and (2), it is observed that two key characteristics of Bloom filters make them ideally suited to the proposed approach. First, the size of a Bloom filter is independent of the size of the elements. This means it is possible to use very long content IDs without increasing the size of the Bloom filter. For instance, to create a Bloom filter for 50,000 content IDs, and given that the optimal number of hash functions is used, then to achieve a false-positive probability of 2%, approximately 8 bits per element will need to be used, giving a total Bloom filter size of approximately 50 kB. If the size of each content ID is assumed to be 256-bits, then without Bloom filters, conveying information about 50,000 IDs would require approximately 1.5 MB of space. The number of hash functions used has a bearing on the computational complexity of the Bloom filter, since the number determines the bits that need to be read to test for membership. From equation (1) it can be deduced that the optimal number of hashes grows only linearly with the number of bits per element, b, where b is given by the ratio m/n.

Figure 9:
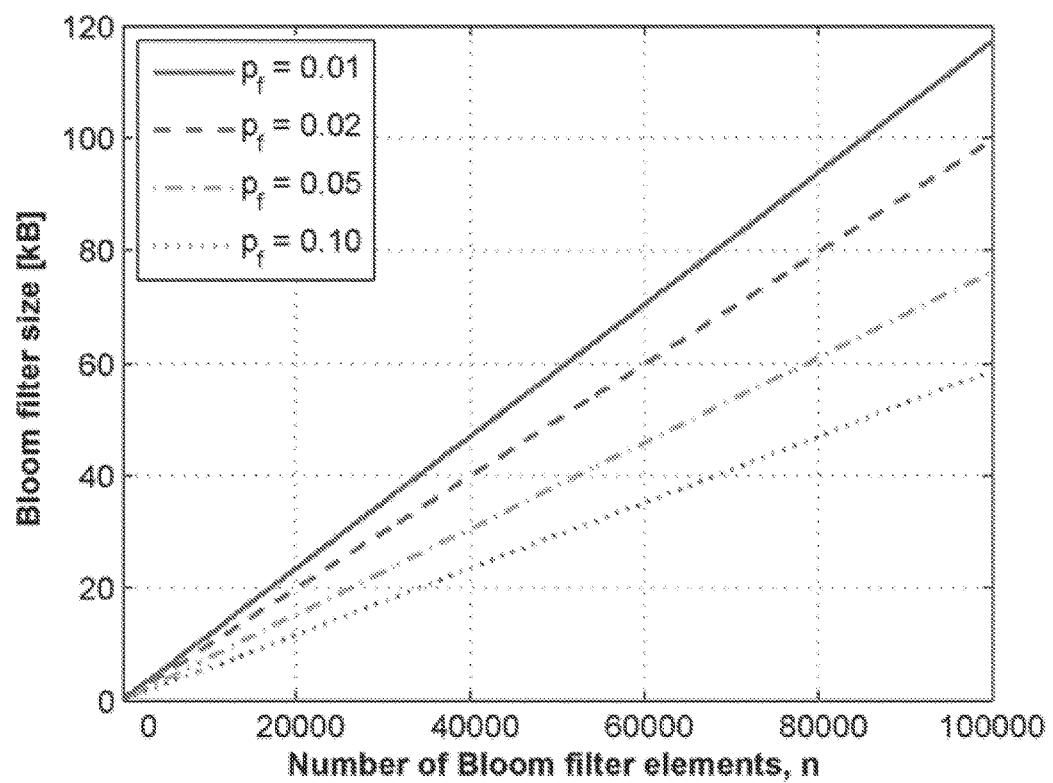
FIG. 9 illustrates a schematic on the effect of the number elements on the size of the Bloom filter according to the present application.

According to an embodiment, a plot of Bloom filter size for varying numbers of elements and false-positive probabilities is shown in FIG. 9. The solid line, e.g., $p_f=0.01$ provides the largest Bloom filter size in kB for the largest number of Bloom filter elements 'n'. Meanwhile, the dotted line, e.g., $p_f=0.10$, provides for the smallest Bloom filter size in Kb for the smallest number of Bloom filter elements 'n'.

When a CR receives a PCP, it must process the information contained therein and update the relevant rows in the CRT, such that the context information it contains can be associated with a set of existing content IDs. The PCP message processing algorithm is given in Pseudocode 1 below.

---

Pseudocode 1 - Processing a Publish Primitive at a Content Router

```
1:    function PROCESS (PCP)
2:        BF ← PCP.BloomFilter
3:        C ← PCP.ContextInfo
4:        I ← IP.GetRcvInterface(PCP)
5:        for each row in CRT do
6:            E ← row.ContentID {the content ID element to hash}
7:            E_hashed ← E {initialise hashed element}
8:            for each HashFn in BF.HashFns do
9:                E_hashed ← HashFn(E)
10:           end for
11:           check ← (BF.BitString | E_hashed)
12:           if (check == E_hashed) and (I ∈ row.Interfaces) then
13:               CRT.UpdateContent(row.ID, I, C)
14:           end if
15:       end for
16:   end function
```

---

In order to extract all the content IDs from the Bloom filter message, the CR must perform k hash operations on each content ID, $c_i$; $1 \le c_i \le N_{crt}$, contained in its CRT, and then in turn, compare each hashed content ID with the Bloom filter message. If the '1' bit positions of $e_i$ matches those of the Bloom filter message, then it is a member of the Bloom filter (or with probability, $p_f$, it is not really a member, e.g., it is a false-positive). On the other hand, if $e_i$ is found to be a member and the ID of the network interface on which the PCP message was received matches one of the Interface field entries in the CRT for the given content ID, then the context information related to that content ID and interface is updated with the context information contained in the PCP message.

To minimize the effect of Bloom filter false-positives, the PCP message processing algorithm checks not only for membership of the content ID in the Bloom filter but also for membership of the identifier of the network interface on which the PCP message was received in the given content ID's CRT interface list. Thus, if a false positive does occur, it will affect only the accuracy of the context information of that particular content ID's interface information. As a result, the content resolution process, discussed in more detail below, will still be able to route content requests towards one of the available sources of the requested content, although the routing decision may be suboptimal.

Once a CR has extracted the relevant information from the PCP message, the context information contained therein is updated and published in the CRT 510 before forwarding on to the next-hop content router(s). This update of context information is based on the adjustment of metric information according to whether the metric is concave or additive. For example, the distance metric is simply incremented by one. On the other hand, the path utilization is updated with the measured utilization of the link through which the PCP message was received, and is updated only if the locally measured link utilization is less than the overall path utilization. The server utilization is not changed along the PCP dissemination paths.

According to yet another embodiment, when published content is removed from a content server, an Existing-Content De-publication (ECD) message must be sent by the first-hop CR to all other CRs in the domain. The format of the ECD message is the same as that of the OCP message, except that the 'New Content ID' field will be replaced with 'Existing Content ID'. When a CR receives an ECD message, it will remove from the CRT the relevant interface and context information associated with each content ID contained in the message.

Content Resolution

According to another aspect of the application, content resolution between a Content client and CR is conducted whereby content is requested and delivered. For example, a Content client 430 submits a content request to their first-hop CR. As shown in FIG. 4, the content request from the Content client 430 is transmitted to its first-hop CR 420, e.g., CR-F. The Content request is depicted as a dotted arrow titled, "Resolution signaling" beginning at the Content client 430 and moving in the direction of the Content Server 410. From a macro level, this first-hop CR 420 determines the best next-hop towards a content source hosting the requested content, e.g., Content server 410. In order to do so, the resolution decision made by each CR 420 is based upon the context knowledge each CR 420 has accumulated from the PCP messages received from the Content server 410.

When a CR 420 receives a content request from a Content client 430 in which there is more than one entry in its CRT 510 hosting the requested content, the CR 420 must make a decision about which network interface to employ in order to resolve the content request. Namely, the CRM 550 identifies the best server/path combination with mixed context metrics under consideration. Here, the CRM 550 is configured to check the CRT 510 and update the CFT 520 as necessary. One of a number of strategies may be employed to determine the best next-hop towards the requested content.

Figure 10:
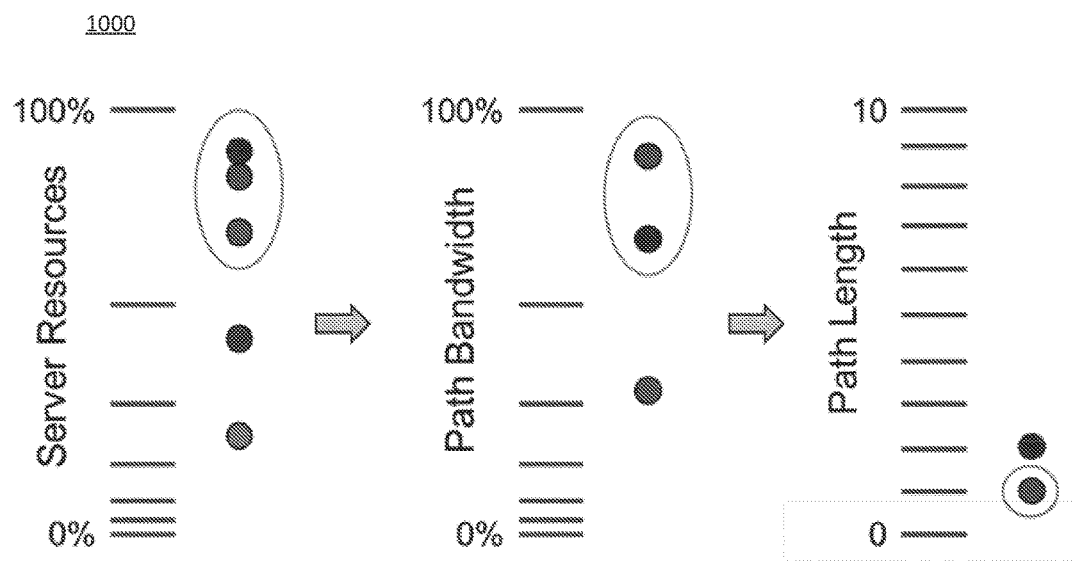
FIG. 10 illustrates an embodiment of a metric for prioritizing and selecting a next-hop according to the present application.

In one embodiment, as shown in FIG. 10, a prioritization chart 1000 of various context metrics is illustrated. The metrics include but are not limited to server resources, Path Bandwidth, and Path length. Namely, tie-breaker tests are performed on the next priority metric if the values of the higher-priority metric(s) are generally equal, or lie within a certain predetermined range from each other. As shown in the chart 1000 for server resources, the circle indicates particular values which fall within a determined range. The processor, by way of the CRM 550, determines these values, e.g., 3 in the illustration. Next, the processor evaluates the highest values of the previously determined values for the server resources for the next metric. In this case, it is path bandwidth. The circle encompasses two values that appear to be within a predetermined range. These values are determined and assessed according to a third metric. In this case, it is path length. The winner is the final value encompassed by a circle for path length. Additional metrics, and the order in which they are employed are envisaged within the contents of this application. Preferably, to ensure sufficient consideration and optimization of all context metrics, non-linear ranges are used, such that higher QoS metric values have looser ranges, and vice versa.

In another embodiment, once the best next-hop CR to forward the content request is determined by the CRM 550 upon reviewing the CRT 420, it will select the Content ID and its forwarding state and install it in the CFT 520. Accordingly, the appropriate interface for sending the content data towards/to the Content client 430 is determined. Moreover, when the CR 420 receives content from the content server 410, the CRM 550 will check the forwarding states in the CFT 520 for sending on to the Content client 430.

Content Delivery

Further, content delivery is based upon forwarding states in each CR created during the associated content resolution phase. Delivery may be directed from the Content server 410 through one or more CRs 420 to the Content Client 430. In an exemplary embodiment, content delivery is depicted by the thick, hollow arrow in FIG. 4. Namely, when the CR 420 receives content from the content sever 410, the CRM 550 checks the CFT 520.

Results and Discussion

Mean Request Rate

The performance of the proposed CCPR mechanism was evaluated by means of computer simulation using the GEANT topology as the reference topology, a pan-European Point-of-Presence (PoP) data network for the research and education community. Specifically, the topology of the year 2004 was used, which consists of 23 PoP nodes, and 74 high capacity interconnecting network links. This choice of topology was influenced primarily by the availability of real path congestion measurements extending over four months conducted within the TOTEM project, hence ensuring that the modelling is realistic. Such traffic matrices were scaled down and used to represent background traffic within the network. Five Content servers were deployed at different locations within the network, each hosting 10,000 contents selected randomly from a pool of 25,000 possible contents, except for the 1,000 most popular contents, which were hosted by all Content servers.

Figure 11:
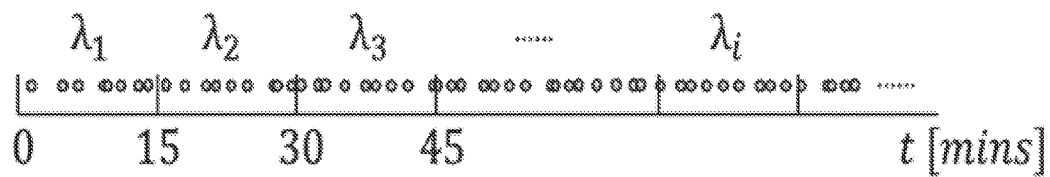
FIG. 11 illustrates an embodiment of mean request rates according to the present application.

The user-request patterns were synthetically generated based on the characteristics of real 'YouTube' request traces. This was achieved by observing the mean request rate, $\lambda$, in each 15-minute interval, $\Delta_i$, and generating Poisson-distributed sets of content requests with different factors, $\beta$, $0.5 \le \beta \le 2.5$, of the set of mean content request rates, as illustrated in FIG. 11. The popularity of the contents followed a Zipf distribution with shape parameter, $\alpha=1.0$. Finally, the performance of the CAINE scheme is compared against a simple, static context-unaware (closest-source) scheme.

wLoad-Balancing Efficacy

Figure 12A:
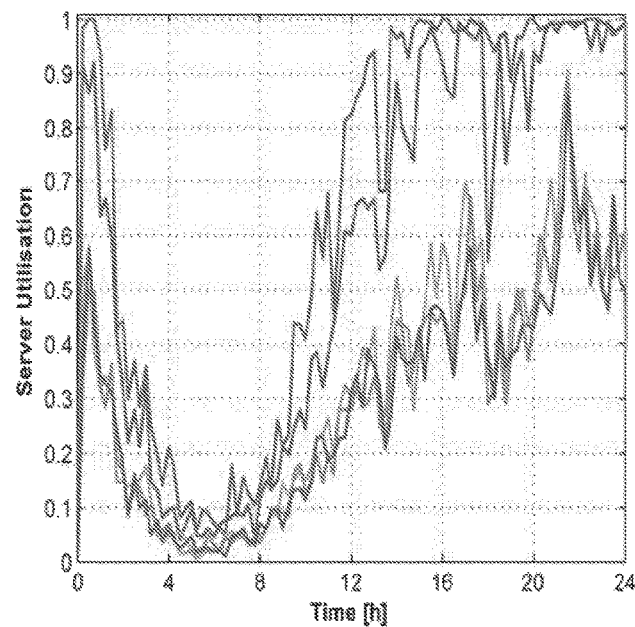
FIGS. 12A-B illustrate performance and results of server utilization of different servers in the context-unaware and context-aware approaches according to the present application.
Figure 12B:
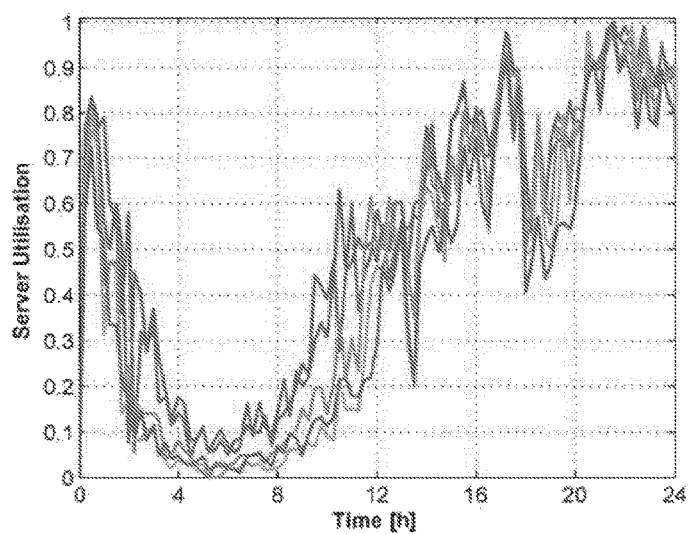

To illustrate the load-balancing efficacy of the CAINE scheme, the utilization of the five servers was measured at 15-minute intervals across 24-hours of simulated time, and plotted and illustrated in FIGS. 12A-B for both (a) the context-unaware approach, and (b) the context-aware approach, respectively. It can be seen that under the context-unaware approach, the server load of two of the five servers was saturated or very close to saturation for approximately 50% of the time, whereas under the context-aware approach, the content servers only ever neared saturation for a very short interval.

Figure 13:
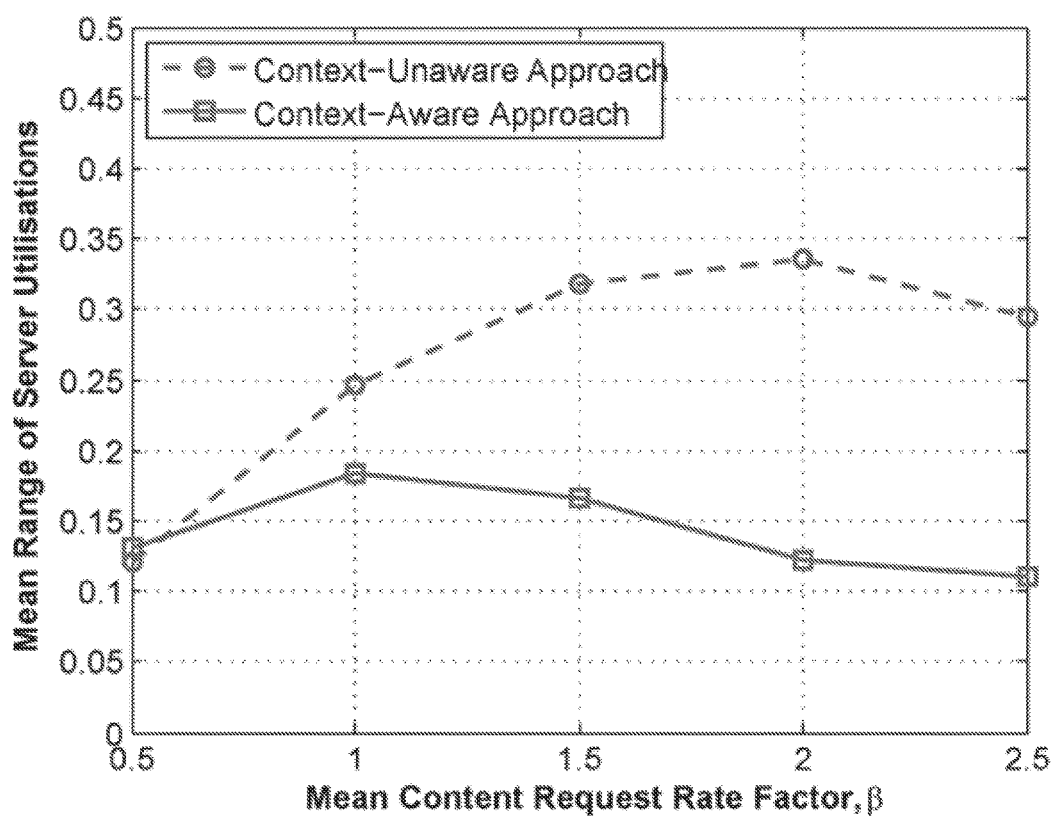
FIG. 13 illustrate performance and results of the mean range of server utilizations for context-unaware and context aware approaches according to the present application.

An alternative representation of the server-load-balancing efficacy of the two approaches was plotted and illustrated in FIG. 13 the mean range of server utilizations across the 24-hour period that was simulated. From this figure, it can be seen that under low content request rate factors, $\beta$, the context-aware approach has a load imbalance of 13%, which is marginally greater than that of the context-unaware approach. This is due to the fact that at low content request rates, the server utilization is relatively low, resulting in reduced frequency of PCP updates, and thus reduced freshness of context information. However, with increasing values of 13, as server utilization rises towards more critical levels, the load-imbalance of the context-aware approach tends towards 10%, whereas that of the context-unaware approach increases to as much as 33%. The improved performance of the context-aware approach over the context-unaware approach at higher values of $\beta$ is due to the increased frequency of PCP transmissions that occurs at higher server utilization, and the resulting effect of fresher context information at the CR.

Content Resolution Success Rate

Figure 14:
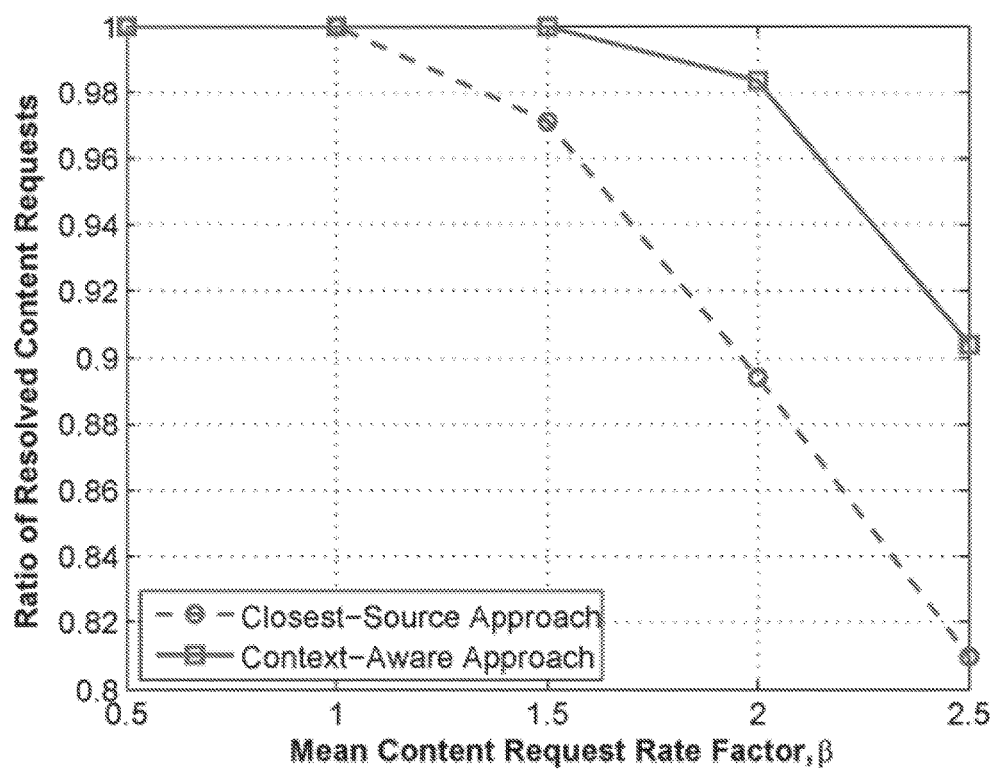
FIG. 14 illustrates performance and results of the ratio of resolved context requests for context-unaware and context-aware approaches according to the present application.

A consequence of the greater load-imbalance of servers in the context-unaware approach is the reduced ratio of successfully resolved content requests, which is due to the saturation of servers. A plot of the ratio of resolved requests is shown in FIG. 14. At low β when none of the servers reach saturation, all content requests are fulfilled. However, at high β, as servers are saturated for some of the time, as much as 9% more content requests were fulfilled under the content-aware approach than under the context-unaware approach.

Maximum Link Utilization

Figure 15:
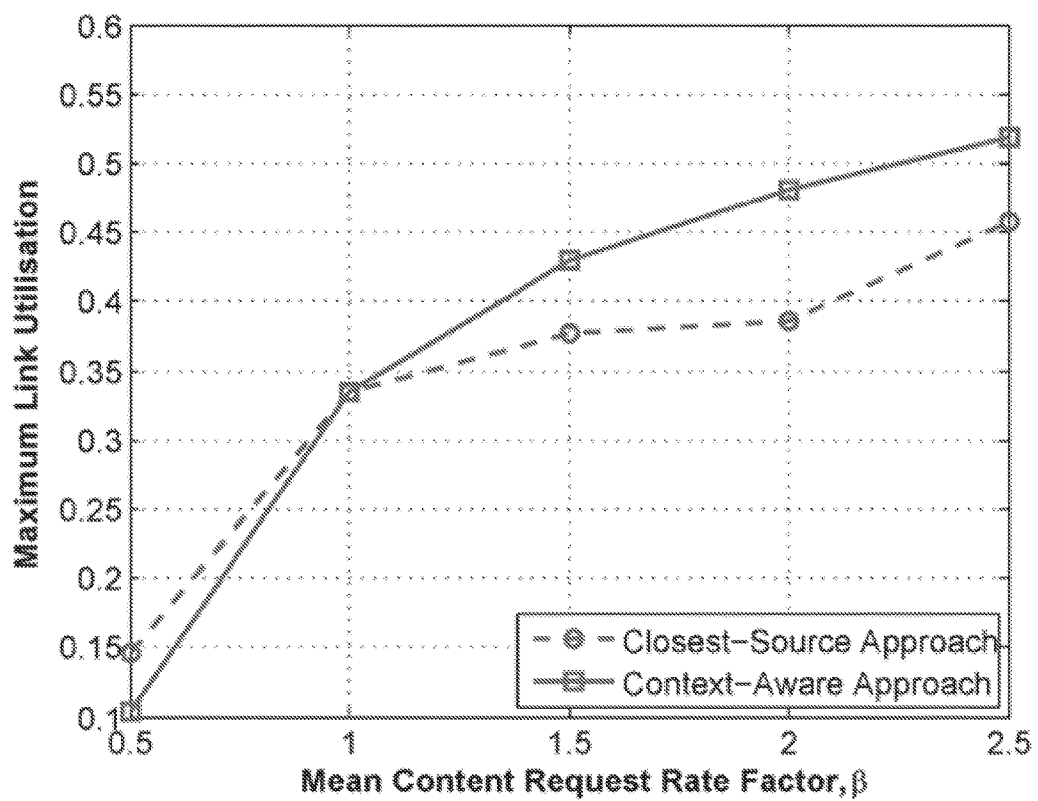
FIG. 15 illustrates performance and results of maximum link utilization of the closest-source approach and context-aware approach according to the present application.

As a result of the reduced number of successfully resolved content requests, the Maximum Link Utilization (MLU) plot as shown in FIG. 15, of the context-unaware approach was found to be up to 8.7% lower than that of the context-aware approach, since there were fewer concurrent content sessions. When the MLU of both approaches are normalized by the ratio of fulfilled content requests, this difference was reduced 5.7% at most.

Content Delivery Path Length

Figure 16:
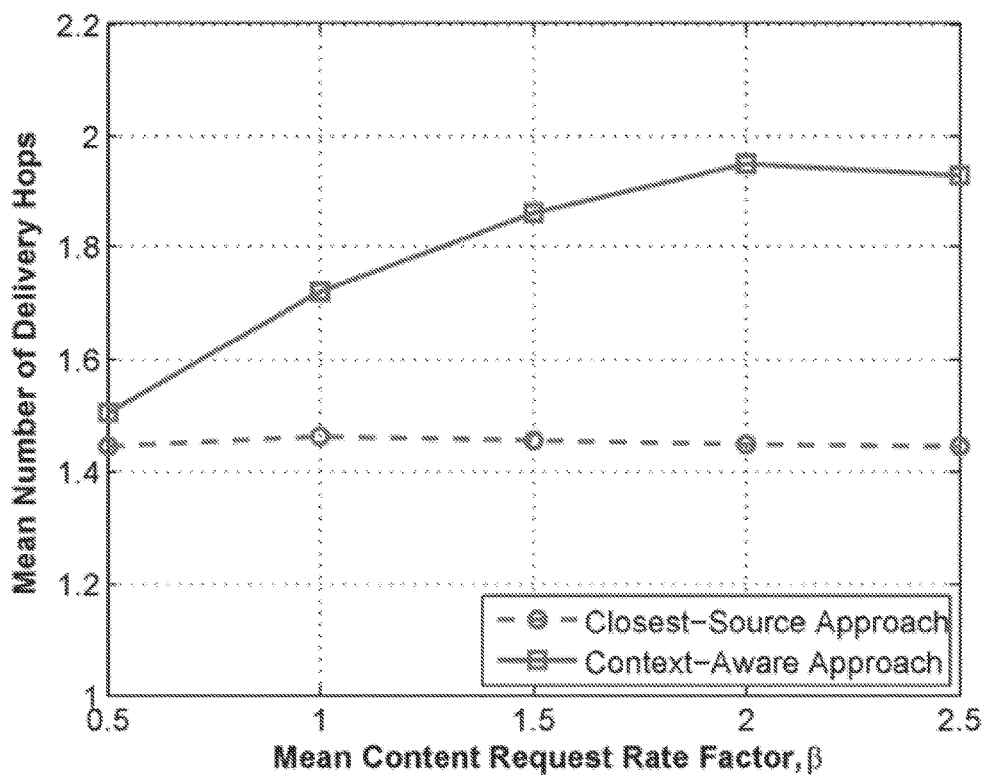
FIG. 16 illustrates performance and results of the mean number of delivery paths hops for the closest-source approach and context-aware approach according to the present application.
Figure 17:
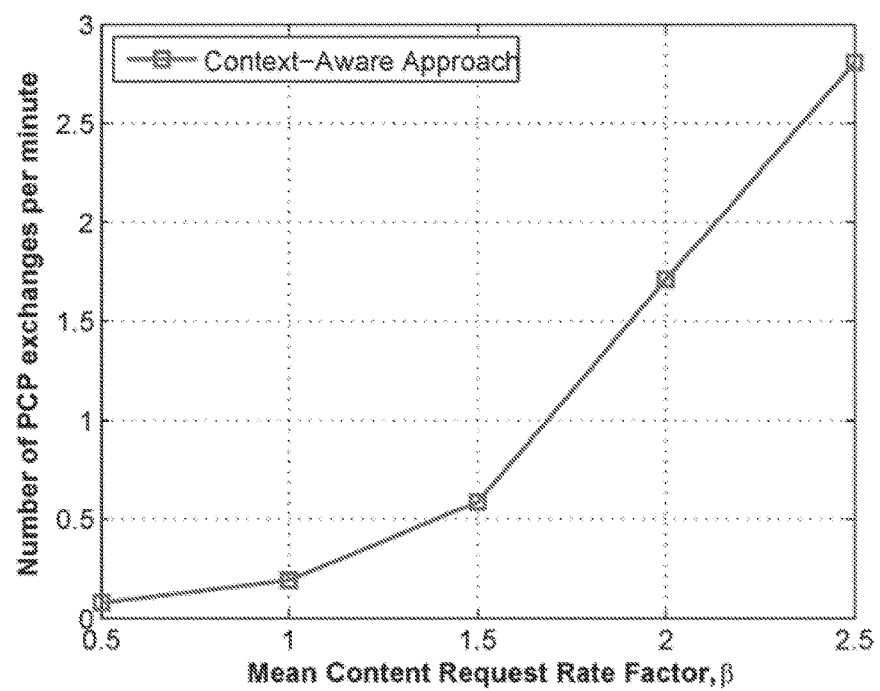
FIG. 17 illustrates results for Pseudocode Content Publication message exchange frequency.

The effect of increasing PCP frequency in the context-aware approach which occurs at increasing β is also evident in the observed mean content delivery path length plot illustrated in FIG. 16. In the context-unaware approach, the mean hop count remains constant at 1.4 hops and independent of the value of β. However, in the context-aware approach, for low β, the mean hop count was only marginally greater than that of the context-unaware approach, increasing to 1.9 hops for higher values of β. This increase in hop count of the context-aware approach over the context-unaware approach is due to the reduced flexibility in optimizing this metric at higher values of β, due to the greater priority given to server-load-imbalance optimization PCP Messaging Overhead An analysis of the mean frequency with which PCP messages are exchanged by servers at different values of β is provided. As can be seen in FIG. 17, the PCP messaging frequency can be observed to increase exponentially with increasing β, from PCPs being exchanged every 14 minutes at β=0.5, to every 20 seconds at β=2.5. However, such high rate of messages occurs only when the content servers approach saturation. Furthermore, such messages are approximately only 10-KB in size for advertising 10,000 contents, and are processed very efficiently at content servers using direct bit-wise comparisons.

According to yet another aspect of the present application, it is understood that any or all of the systems, methods and processes described herein may be embodied in the form of computer executable instructions, e.g., program code, stored on a computer-readable storage medium which instructions, when executed by a machine, such as a computer, server, router, or the like, perform and/or implement the systems, methods and processes described herein. Specifically, any of the steps, operations or functions described above may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium which can be used to store the desired information and which can be accessed by a computer.

According to yet another aspect of the application, a non-transitory computer-readable or executable storage medium for storing computer-readable or executable instructions is disclosed. The medium may include one or more computer-executable instructions such as disclosed above in the call flows such as in FIG. 4. The computer executable instructions may be stored in a memory and executed by a processor disclosed above in FIGS. 1C and 1D, and employed in devices including but not limited to content delivery providers and router manufacturers. In one embodiment, a computer-implemented router having a non-transitory memory and processor operably coupled thereto, as described above in FIGS. 1C and 1D, is disclosed. Specifically, the non-transitory memory of the router has instructions stored thereon for performing updating context information of content on the router. The processor is configured to perform the instructions of: (i) receiving a pseudo-content publication message from a server including updated content and a bloom filter; and (ii) determining whether the content on the router is a member of the bloom filter.

According to another embodiment, the non-transitory memory includes a content record table and instructions stored thereon for forwarding a content request from a client to a server. The processor is configured to perform the instructions of: (i) receiving the content request from the client; (ii) reviewing the content record table based upon the content request; and (iii) determining a next-hop for receiving the content request.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A router comprising:
   a non-transitory memory having instructions stored thereon for updating context information of content on the router; and
   a processor, operably coupled to the memory, the processor configured to perform the instructions of:
   receiving a pseudo-content publication message from a server including updated content and a bloom filter;
   determining whether the content on the router is a member of the bloom filter;
   revising the context information on the router that is a member of the bloom filter with context information of the updated content received in the pseudo-content publication message; and
   determining whether an identifier of a network interface for the received PCP message matches an interface entry for the content in the router.

2. The router of claim 1, wherein the processor is further configured to perform the instructions of revising the context information on the router that is a member of the bloom filter with context information of the updated content received in the pseudo-content publication message.

3. The router of claim 1, wherein the processor is further configured to perform the instructions of receiving an original content publication message from the server.

4. The router of claim 3, wherein the processor is further configured to perform the instruction of determining whether an identifier of a network interface for the received pseudo-content publication message matches an interface entry for the content in the router.

5. The method of claim 1, wherein the context information is a function selected from server state, network state and combinations thereof.

6. The method of claim 5, wherein the function is selected from server resource availability, path bandwidth, path length and combinations thereof.

7. A computer-implemented method for updating context information of content in a router comprising:
   receiving a pseudo-content publication message (PCP) from a server including updated content and a bloom filter;
   determining whether the content on the router is a member of the bloom filter;
   revising the context information on the router that is a member of the bloom filter with context information of the updated content received in the pseudo-content publication message; and
   determining whether an identifier of a network interface for the received PCP message matches an interface entry for the content in the router.

* * * * *